April 19, 1949.  A. O. B. OLSON  2,467,492
ELECTRIC HEATED PROCESSOR

Filed Nov. 18, 1944  2 Sheets-Sheet 1

INVENTOR
Arne O.B. Olson
by his attorneys
Stebbins, Blenko
& Webb

April 19, 1949. A. O. B. OLSON 2,467,492
ELECTRIC HEATED PROCESSOR
Filed Nov. 18, 1944 2 Sheets-Sheet 2
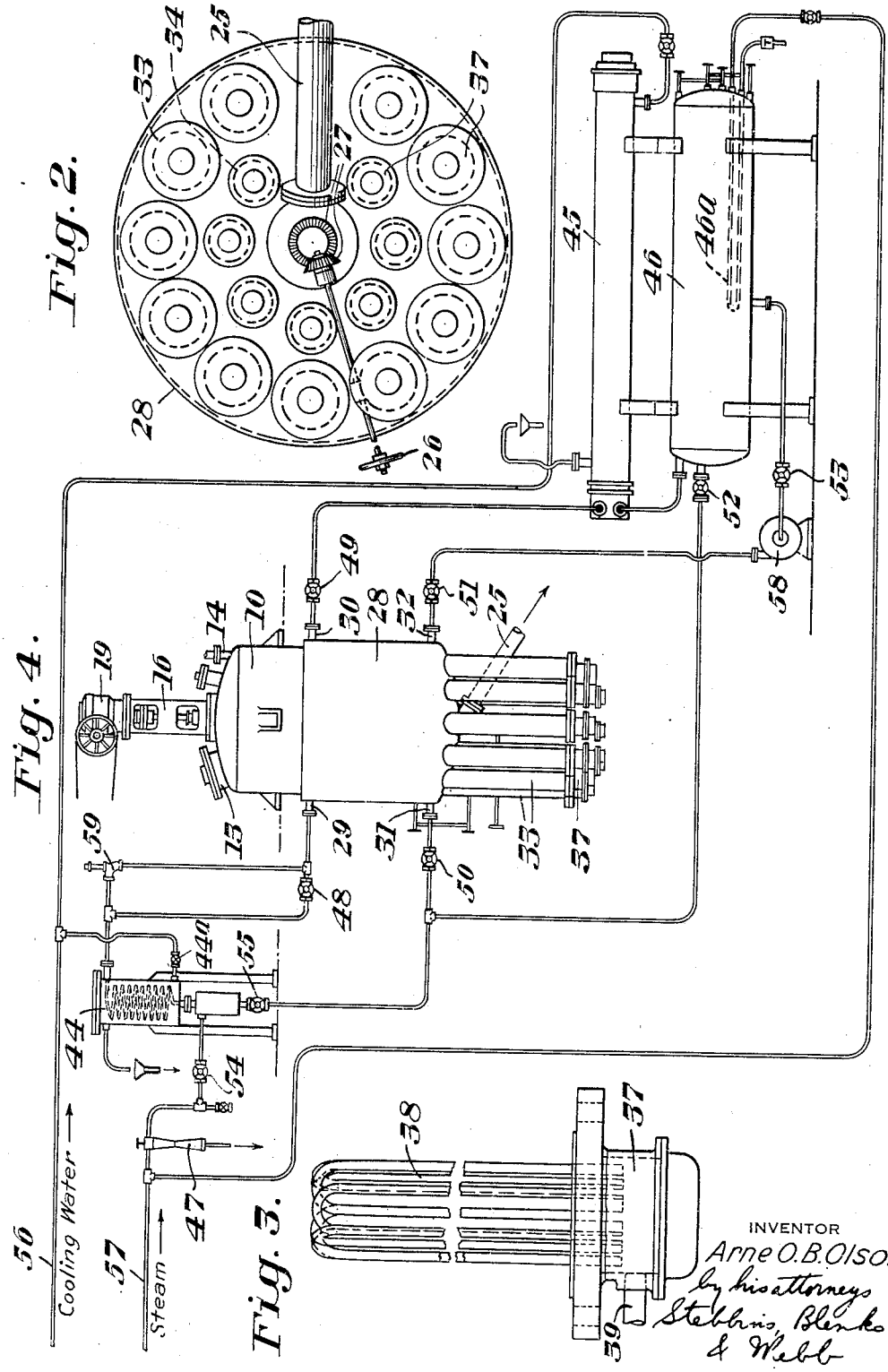
INVENTOR
Arne O. B. Olson Patented Apr. 19, 1949

2,467,492

UNITED STATES PATENT OFFICE 2,467,492

ELECTRIC HEATED PROCESSOR

Arne O. B. Olson, O'Hara Township, Allegheny County, Pa., assignor to Blaw-Knox Company, Pittsburgh, Pa., a corporation of New Jersey Application November 18, 1944, Serial No. 564,101

5 Claims. (Cl. 219—44)

This invention relates to a processing or reaction vessel and, in particular, to means for heating it to relatively high temperatures, i. e., temperatures in excess of 350° F.

Reaction vessels as heretofore constructed have been provided with various types of heating means. One of these comprises a jacket around the bottom and lower portion of the vessel, to which heating vapor is supplied from a boiler. This arrangement involves the use of a considerable volume of vaporizable liquid, usually a mixture of organic compounds having desirable properties for the purpose. The cost of the liquid is thus a substantial item. Because of the amount of liquid used, furthermore, considerable heat must be supplied in order to raise it to the boiling point. The heat stored in the liquid, furthermore, is lost when the apparatus is shut down.

It has also been proposed to heat reaction vessels directly by electrical-resistance heating elements. The amount of heat which can be supplied in this manner, however, is limited by the available external surface area of the vessel.

I have invented a processing or reaction vessel having novel heating means which avoid the aforementioned objections and make possible the rapid and efficient heating of the vessel and, furthermore, facilitate the rapid cooling of the vessel should this be desirable, as it is in certain cases. In a preferred embodiment, I employ a jacket adapted to withstand substantial differences of pressure between the exterior and interior thereof, enclosing the bottom and lower portion of the vessel and I provide a plurality of heating tubes extending downwardly from the bottom of the jacket and communicating with the interior thereof. The jacket and tubes are adapted to contain a pool of vaporizable liquid and the jacket provides a vapor space above the surface of the pool. For heating the liquid, I provide elongated immersion heating elements of the electrical resistance type, extending upwardly into the tubes and the bottom of the jacket. The heating tubes are spaced circumferentially around the jacket bottom, leaving a clear space centrally thereof for a discharge valve. If it is desired to cool the vessel as well as to heat it, the jacket is provided with suitable pipe connections for this purpose.

Further novel features and advantages of the invention will be explained in the following detailed description which refers to the accompanying drawings illustrating a preferred embodiment and a system in which it is adapted to be connected. In the drawings, Figure 1 is a vertical central section through a processing vessel according to my invention, with parts in elevation;

Figure 2 is a bottom plan view;

Figure 3 is an elevation of a heating element; and,

Figure 4 is a diagrammatic view showing the vessel in side elevation to reduced scale, of a system adapted to effect cooling of the vessel after it has been heated to the desired temperature for the proper period.

Figure 1:
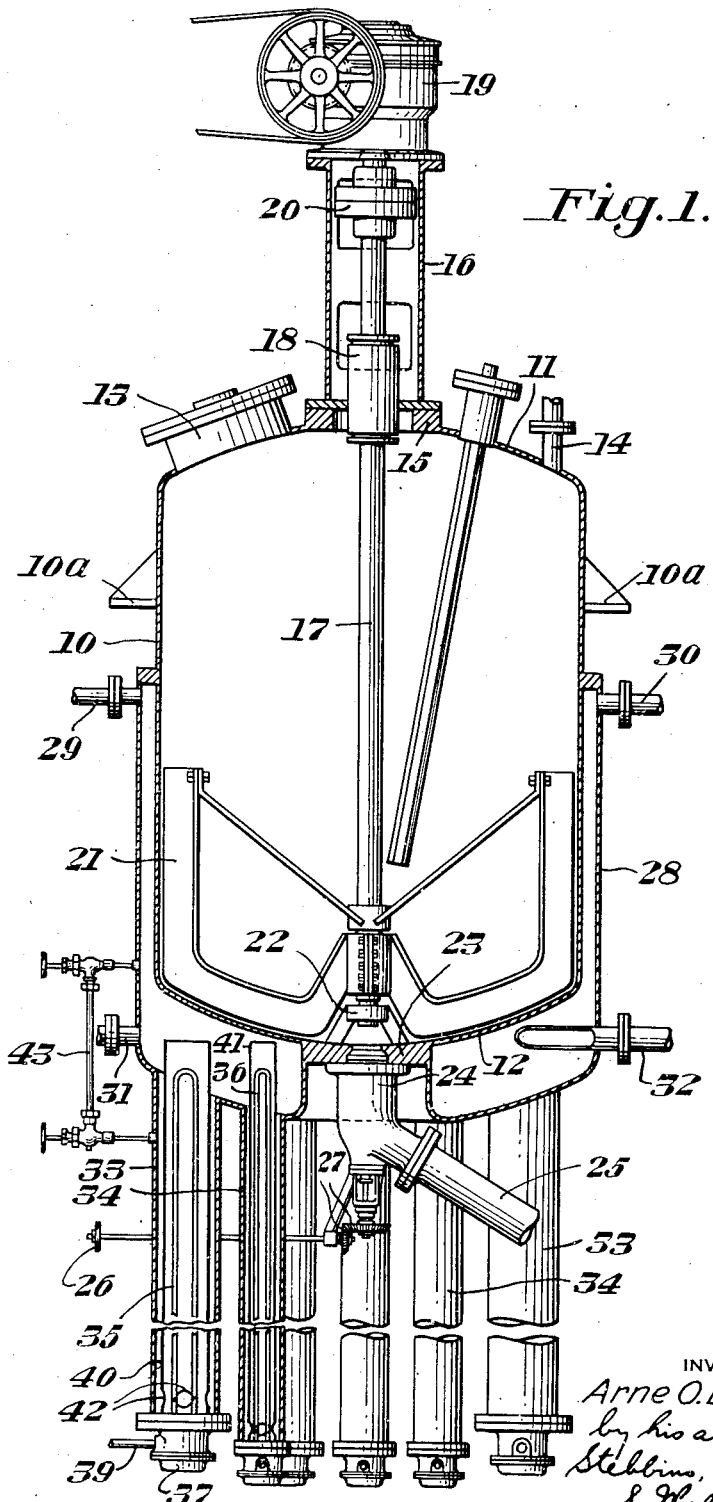

Referring in detail to the drawings and, for the present, to Figures 1 through 3, the vessel of my invention comprises a container 10 which may conveniently be cylindrical and provided with dished heads forming a top 11 and bottom 12. Supporting feet 10a are secured to the container adjacent the top and are spaced circumferentially thereof. The top is provided with a manway 13 and a vapor outlet 14. The top also has a central opening defined by a hub 15 adapted to support a housing 16. A vertical agitator shaft 17 is journaled on a thrust bearing 18 mounted in the housing and is adapted to be driven by any suitable means through reduction gearing 19 to which the shaft is connected by a coupling 20. An agitator 21 is mounted on the shaft adjacent the lower end thereof which is journaled in a bearing 22. The bottom 12 of the container has a central discharge opening defined by a hub 23 to which is secured a valve 24. A discharge pipe 25 extends laterally from the valve. The valve is operated by means of a handwheel 26 on a shaft extending radially through bevel gearing 27.

A jacket 28 surrounds the lower portion of the vessel and the bottom thereof except for the central portion adjacent the hub 23. Pipe connections 29 and 30 extend from the upper portion of the jacket and connections 31 and 32 from the lower portion thereof for purposes which will appear later. For the present, it is sufficient to state that these connections extend to suitable control valves which are closed during the heating of the vessel. Tubes 33 and 34 extend downwardly from the bottom of the jacket 28. The tubes are arranged in circles, as shown in Figure 2. The two types of tubes shown are similar except in size. All the tubes are related to the jacket bottom in the manner of a tube sheet, i. e., they communicate with the interior of the jacket. One tube of each type is omitted from the two circles in which they are arranged to afford a clear space for the laterally extending discharge pipe 25. There is sufficient clearance between adjacent tubes in the two circles to admit the valve-operating shaft on which the handwheel 26 is mounted.

The jacket and tubes are cylindrical as shown and of suitable thickness to withstand high internal pressure and high vacuum at the temperatures desired.

Heating elements 35 and 36 extend upwardly into the tubes 33 and 34. These elements are conveniently of the type shown in Figure 3, each including a base or head 37 from which extend a plurality of tubular sheaths 38 of hairpin shape, each containing insulating material in which is imbedded a helical coil composed of material having suitable resistance to generate heat by the flow of electric current therethrough. A flange on the base is adapted to be secured to a mating flange on the lower end of each tube 33 or 34, by bolts, for example. Any other suitable commercially available electrical immersion heaters may also be used. Suitable current-supply conductors (not shown) enter the head 37 through a conduit 39 and are connected to the ends of the coils. It will be understood that the showing of the heating elements 35 and 36 in Figure 1 is diagrammatic only, since each element includes a plurality of heaters 38, instead of a single one as there illustrated. The heaters 35 and 36, as shown in Fig. 1, are preferably of such length as to be always submerged by liquid lying in the tubes and in the bottom of the jacket.

Tubular baffles 40 and 41 are disposed in the tubes 33 and 34 coaxially thereof. The baffles are of such diameter as to enclose the rods 38 of the heating elements leaving a free space around them. At the same time, the baffles are sufficiently smaller than the heating tubes to leave a free space therebetween. The baffles extend upwardly to a height greater than that of the rods 38 and slightly above the operating hot-liquid level in the jacket. Holes 42 through the baffles 40 and 41 are provided adjacent their lower ends. These holes permit the ingress of liquid from the space between the tubes and the baffles as the liquid within the baffles is heated and ascends through the upper ends which are open.

In operation of the apparatus described, sufficient vaporizable liquid is introduced into the jacket to cover the heaters and to provide a hot liquid pool of desired depth. This pool may, if desired, have surface contact with the bottom 12 of the container 10, as is useful in conjoint use of the present invention with the cooling arrangement disclosed in the co-pending application of Herbert L. Barnebey et al., Serial No. 564,078, filed November 18, 1944 for Heat exchange apparatus, but generally the hot liquid level is preferred slightly below the tops of the baffles 40 and 41. When it is desired to heat the container and its contents, all gases except vapor of the heating fluid are removed from the jacket and current is supplied to the heating elements 35 and 36. The liquid within the baffles 40 and 41 is thereby heated and quickly vaporized. The vapor ascending through the baffles entrains liquid with it, thereby including a vigorous circulation of liquid from the main body of the pool in the bottom of the jacket downwardly through the heating tubes and into the holes 42 in the lower ends of the baffles. Vapor arising from the surface of the pool in the jacket fills the space thereabove and condenses on the walls of the container and jacket giving up its heat thereto. The condensate falls back into the pool and is again vaporized.

The energization of the heating elements is continued until the contents of the vessel have been raised to the desired temperature and maintained thereat for an appropriate length of time. If it should then be desired to cool the charge in the vessel, the supply of current to the heating elements is shut off and cooling applied in some desired manner, for example as disclosed in the copending application referred to above or in the manner subsequently described herein. Some processing operations become exothermic on reaching a certain state and it may thus be desirable to remove heat at a substantial rate quite promptly. The vessel of my invention is well adapted to operating cycles of this character. Instead of relying on superficial cooling of the exterior of the container and jacket, which is satisfactory in certain cases where a relatively low rate of heat removal is permissible, I preferably employ a system such as shown in Figure 4, including means for maintaining a substantial quantity of the same liquid utilized for heating the vessel, but at a relatively low temperature such as that of the atmosphere, which can be drawn upon very quickly to exert a high chilling effect on the vessel.

The system of Figure 4 includes, in addition to the vessel 10, a condenser 44, a cooler 45, a surge tank 46 and an ejector 47. This apparatus is connected to the vessel by suitable piping controlled by valves 48 through 55 which will be referred to individually in explaining the operation of the system. As previously explained, the jacket 28 is isolated during the heating stage. This is accomplished by closing valves 49 through 51 installed in the connections 29 through 32. It is to be understood, however, that the cooler 45 and tank 46 are full of the same liquid with which the jacket 28 is partly filled. Cooling water is supplied to the cooler 45 as well as to the condenser 44 through a connection 56 to any suitable source of supply. A steam pipe 57 connected to a suitable source supplies steam to a heating coil 46a in the tank 46 as well as to the ejector 47. The cooler 45 and tank 46 together provide a substantial volume of vaporizable liquid at a temperature approximately that of the atmosphere. The steam coil 46a serves, when needed, to maintain the liquid at a temperature at which it flows readily. In order to apply cooling to the vessel, the valves 48 and 50 are opened and water is admitted to the condenser 44 by opening valve 44a. The valves 52 and 54 are closed at this time and the valve 55 is opened. The vapor in the upper portion of the jacket 28 is thus condensed in the condenser 44 and the condensate returned to the jacket through connection 31. This removes a substantial portion of the sensible heat of the vessel and contents. After this initial cooling, the valves 49, 51 and 53 are opened and a circulating pump 58 is started to deliver cold liquid from the tank 46 to the jacket. The level of the liquid in the jacket 28 thus rises to the connection 30 from which it returns to the cooler 45 and thence to the tank 46. It will be apparent that the circulation of a substantial volume of relatively cold liquid through the jacket 28 quickly abstracts the heat of the vessel and the charge therein. The liquid in the heating tubes is cooled by gravity circulation within the individual tubes but the temperature of the liquid in the tubes has but little effect on the temperature of the vessel as a whole, in comparison to the effect of the circulation of cold liquid through the jacket.

When circulation of the cold liquid starts, there may be some flashing of vapor in the jacket. This vapor, like that previously existing in the jacket, is condensed on passage through the condenser 44. To prevent the evolution of excessive amounts of vapor, circulation of the cold liquid should initially be limited by manipulation of the valve 49.

At the end of the desired cooling period, the valve 24 is opened and the contents discharged through pipe 25. The pump 58 is shut down and valve 52 is opened as well as a vent cock (not shown) at the top of the jacket permitting gravity flow of the liquid from the jacket through connection 31 to the tank 46 until the level has fallen to that of the connection. The vessel is then ready to receive a fresh batch of material to be processed. Before commencing the heating stage of the next cycle, the vent cock and valves 49 and 51 are closed. The valve 54 is opened and steam is admitted to the ejector 47. A vacuum is thus applied to the vapor space of the jacket 28 and the air therein is withdrawn through the condenser and is discharged into the atmosphere by the ejector. Condensate from the condenser returns through the jacket from the connection 31. When the air has all been removed from the jacket, the valves 48 and 50 are closed and the condenser 44 and ejector 47 are shut down and valves 52 and 54 are closed. Inasmuch as the liquid in the jacket and tubes is relatively cold after the cooling has been completed, the heating elements 35 and 36 may be energized while the vapor space is being evacuated of air, as there is generally sufficient time required for heating the cold liquid to its boiling temperature at vacuum, to effect evacuation of the jacket; but if desired, the energizing of the heating elements may be deferred until evacuation is completed. After the above-mentioned valves have been closed and the liquid begins to boil pressure is built up in the vapor space above the liquid in the jacket. A relief valve 59 tapped into the connection 29 protects the jacket against excessive pressure. When the heating stage of the processing cycle has been completed, another cooling stage may be carried out in the manner already explained.

Many advantages of the invention will be apparent from the foregoing description. In the first place, the amount of liquid to be heated to the vaporization temperature during the heating stage is relatively small. The heat content thereof is correspondingly limited so that the heat lost on passing from a heating stage to a cooling stage is not great. In the second place, the area of the heating surface available for contact with the vaporizable liquid is extensive, being limited only by the maximum length which is convenient for the heating tubes and electric heating elements mounted therein. The entire surface area of the vessel within the jacket, of course is subject to heating by contact with the liquid or its vapor.

The arrangement of heating tubes in concentric circles is particularly desirable since it leaves a clear space at the center for the discharge valve. The valve location is such as to require but a minimum of head room and permits the connection of the discharge pipe quite close to the valve. The tubular baffles surrounding the heating elements promote efficient heating of the liquid in the tubes by maintaining unidirectional circulation of liquid and vapor.

In addition to providing for efficient and expeditious heating of the vessel and contents, my invention permits removal of heat therefrom at a low rate or, alternatively, at a much higher rate, by circulating a quantity of liquid the same as that employed for heating the vessel but at a much lower temperature, through the jacket. The overall cost of a system of this kind is considerably less than that of vapor systems for heating processing vessels as constructed heretofore.

Although I have illustrated and described but a preferred embodiment and practice of the invention, it will be recognized that changes in the construction and procedure may be made without departing from the spirit of the invention or the scope of the appended claims.

I claim:

1. A fluid heater comprising a pressure-resisting chamber having a bottom, a plurality of pressure-resisting tubes depending from said bottom and in open communication with said chamber at their upper ends, resistance heating elements extending upwardly from closed bottom ends of said tubes, tubular baffles spaced inwardly from said pressure-resisting tubes and enclosing said heating elements, said baffles being open at their upper ends, and passages for liquid at the lower ends of said baffles between the exterior and interior of said baffles.

2. A reaction vessel comprising a container, a jacket around the bottom and lower portion, at least, of the container partly filled with vaporizable liquid leaving a vapor space thereabove, a cluster of tubes depending from the jacket and communicating therewith, said tubes being external to the jacket for the most part, and spaced radially and circumferentially of the bottom of the container, a resistance heating element extending upwardly into each of said tubes, and a tubular baffle in each tube enclosing the element therein but spaced inwardly from the tube.

3. A reaction vessel comprising a container, a heat-exchange jacket around the bottom and lower portion, at least, of the container, a vaporizable liquid partly filling the jacket leaving a vapor space thereabove, a discharge valve in the bottom of said container, and elongated heating elements removably inserted into said jacket below the level of the liquid, said elements being disposed wholly below said bottom, spaced circumferentially about said valve, and extending outwardly through the jacket.

4. A reaction vessel comprising a vessel having a cylindrical lateral wall, a bottom, a valved discharge opening in the center of said bottom, a heat-exchange jacket extending radially from said valved opening and upwardly along said cylindrical lateral wall, said jacket being partly filled with vaporizable heating liquid, and a plurality of immersion-type electrical-resistance heaters disposed entirely below said bottom, said heaters being circumferentially arranged about said valved discharge opening and removably inserted into said jacket below the level of said liquid, said heaters extending outwardly through the jacket.

5. A vessel as defined in claim 4, in which said jacket is provided with a cluster of tubes extending downwardly therefrom and spaced about said valved discharge opening, each of said tubes containing one of said immersion-type heaters centrally and longitudinally disposed therein, and a baffle between each tube and its immersion-type heater.

ARNE O. B. OLSON.

REFERENCES CITED

The following references are of record in the file of this patent:

UNITED STATES PATENTS

| Number | Name | Date |
| --- | --- | --- |
| 491,321 | Mitchell | Feb. 7, 1893 |
| 672,454 | Nelson | Apr. 23, 1901 |
| 852,854 | Schoenberg | May 7, 1907 |
| 890,857 | Hadaway | June 16, 1908 |
| 1,442,048 | Christian | Jan. 16, 1923 |
| 1,456,136 | MacDonald | May 22, 1923 |
| 1,916,066 | Moyle | June 27, 1933 |
| 2,236,837 | Rimmel | Apr. 1, 1941 |
| 2,281,906 | Adams | May 5, 1942 |